Aug. 4, 1964                  S. DORNIER ETAL                3,143,318
       AIRCRAFT HAVING AT LEAST TWO JET PROPULSION UNITS PLACED
                SYMMETRICALLY WITH RESPECT TO THE CENTRAL
Filed Feb. 12, 1962              AXIS OF THE AIRCRAFT
                                                    2 Sheets-Sheet 1

INVENTORS.
SILVIUS DORNIER.
BY HANS-MARTIN DATHE.

ATTORNEY.

Aug. 4, 1964　　　　S. DORNIER ETAL　　　　3,143,318
AIRCRAFT HAVING AT LEAST TWO JET PROPULSION UNITS PLACED
SYMMETRICALLY WITH RESPECT TO THE CENTRAL
AXIS OF THE AIRCRAFT
Filed Feb. 12, 1962　　　　　　　　　　　　　　　2 Sheets-Sheet 2
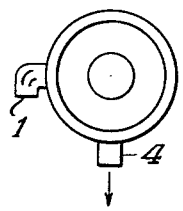
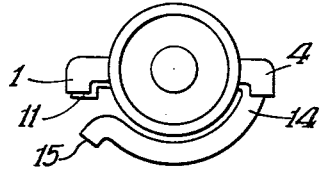
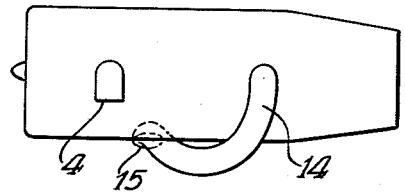
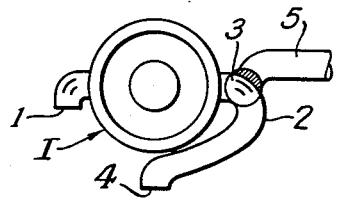
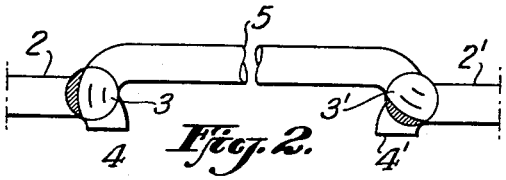
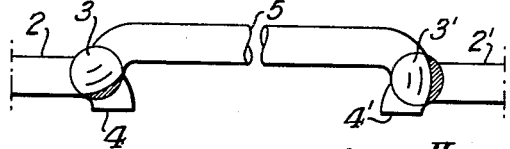
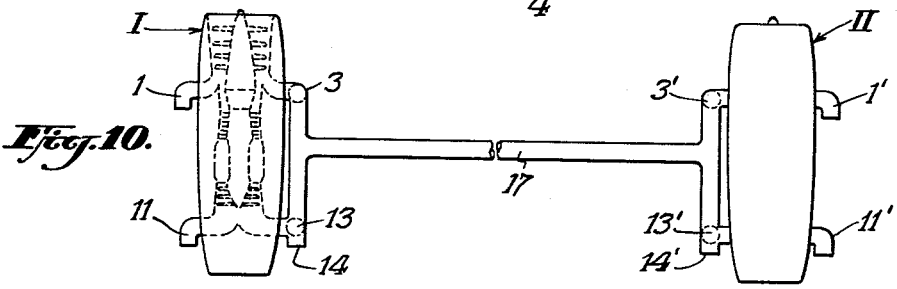
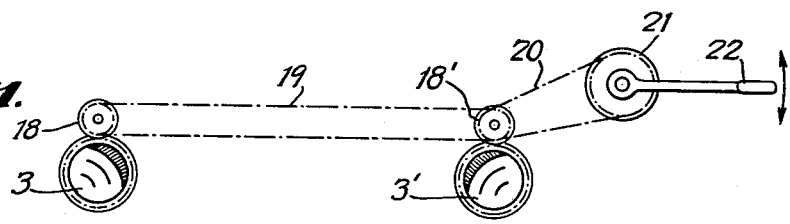
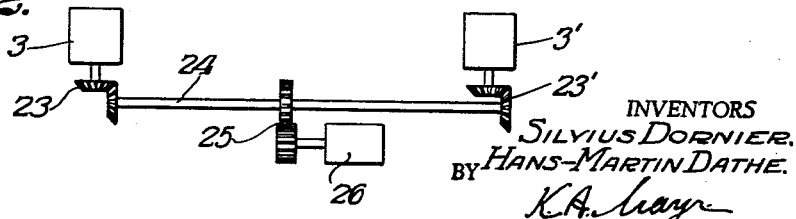
INVENTORS
SILVIUS DORNIER,
HANS-MARTIN DATHE.
BY K.A. Mayr
ATTORNEY.

United States Patent Office 3,143,318
Patented Aug. 4, 1964

3,143,318
AIRCRAFT HAVING AT LEAST TWO JET PROPULSION UNITS PLACED SYMMETRICALLY WITH RESPECT TO THE CENTRAL AXIS OF THE AIRCRAFT
Silvius Dornier and Hans-Martin Dathe, both of Friedrichshafen, Germany, assignors to Dornier-Werke G.m.b.H., Friedrichshafen, Germany, a firm
Filed Feb. 12, 1962, Ser. No. 172,450
Claims priority, application Germany Feb. 16, 1961
11 Claims. (Cl. 244—74)

The invention relates to power plants of aircraft, having at least two jet propulsion engines arranged symmetrically with respect to the central axis of the aircraft.

The invention relates more particularly to airplanes capable to start and land in vertical direction. When starting in a vertical direction it is important to counteract failure of one power plant at least to an extent affording maintenance of equilibrium position of the aircraft. Rolling moments must be avoided by all means.

In conventional systems suitable for starting and landing in vertical direction usually the power unit which is symetrically opposed to the power unit which fails, and on the opposite side of the aircraft, is stopped in order to maintain a symmetric thrust and to avoid rolling moments. This procedure, however, causes a duplication of the loss of propelling force caused by failure of one of the power units. In order to have enough reserve power to support the aircraft upon failure of one unit, it is necessary to provide an undesired great number of power units.

It is known to provide an emergency arrangement in aircraft having two or more jet power plants whereby, for example, the gas streams of two or more power plants are conducted in a common conduit to the nozzles. A valve is interposed between each power unit and said common conduit. At full or partial failure or shutdown of one unit the respective valve is closed automatically in response to the difference between pressures of the gases produced by the units which are in normal operation and of the gas produced by the failing or shut down unit, to avoid gas loss by passing gas into the stopped or failing unit. In this conventional arrangement the gases must pass all the time through the additional conduit to the thrust nozzles.

An arrangement is known having two power units including at least one two-stage compressor and a secondary combustion chamber in each unit. In order to maintain symmertical thrust at failure of a power unit at one side of the aircraft the cold gas of the first compressor stage is conducted into a common receiver wherefrom the gas is conducted through two conduits to the secondary combustion chamber of each unit. At normal operation these conduits are closed by valves. If one unit does not operate, the valves are so adjusted that the secondary combustion chamber of the stopped unit is supplied with combustion air by the first compressor stage of the unit which is still in operation. In this case a secondary combustion chamber with apparatus for injecting fuel must be provided in each power unit. Also special control apparatus is required because thrust is produced in the failing power unit in a manner different from that in which thrust is produced in the normally operating unit.

The present invention deals with aircraft having jet propulsion units placed on opposite sides of the center line of the aircraft, each unit having two thrust nozzles.

The invention is an improvement of the aforedescribed conventional systems for balancing thrust upon failure of the propulsion unit on one side of the aircraft. According to the invention, at normal operation, the two thrust nozzles of each unit are in operation whereas at failure of one power unit, one nozzle only of each propulsion unit is operated. It is an object of the invention to provide simple means for switching from normal operation to emergency operation without substantially disturbing thrust symmetry. With the system according to the invention thrust is produced in the same manner at both sides of the aircraft, also at emergency operation. The system according to the invention does not require special propulsion units but can be operated with the conventional units whereby the units at opposite sides of the aircraft are operated independently from each other at normal operating conditions. In aircraft having two or more jet propulsion units symmetrically arranged at either side of the longitudinal axis of the aircraft one half of the thrust nozzles of each unit, for example, the thrust nozzle or nozzles which is or are relatively close to one side of the center line is or are connected by suitable conduit means to the corresponding thrust nozzle or nozzles on the opposite side of the center line, each conduit means being provided with a valve or like means on either side of the center line whereby the valves are connected for interdependent operation for rendering the conduit means ineffective at normal operation and each thrust nozzle is supplied with gas from the power unit to which it is directly connected. If one power unit fails, the gas flow connection between the power unit and the respective thrust nozzle is stopped and the conduit between the thrust nozzle of the inoperative propulsion unit and the thrust nozzle of the operative propulsion unit is opened so that at least a major portion of the gas available from the operative power unit is conducted through the open conduit to the corresponding thrust nozzle of the inoperative unit. In this manner independent operation of the two power units is made possible during normal operation and gas flows through the conduit connecting the two units only in case of emergency, in contradistinction to conventional arrangements wherein gas flows through the connecting conduit also at normal operation.

The invention is applicable also to aircraft provided with two-stream jet propulsion engines wherein only part of the compressed air is used as combustion air, the balance of the relatively cold air stream being used either directly or admixed to hot combustion gas in thrust nozzles additional to the thrust nozzles operated by hot combustion gas.

The novel features which are considered characteristic of the invention are set forth with particularly in the appended claims. The invention itself, however, and additional objects and advantages thereof will best be understood from the following description of embodiments thereof when read in connection with the accompanying drawing wherein:

FIGS. 2 and 3 are diagrammatic illustrations of a part of the arrangement shown in FIG. 1 in two different operating positions.

FIGS. 5 and 6 are diagrammatic end views of two modifications of a part of the arrangement shown in FIG. 1.

FIG. 7 is a diagrammatic end view of a two-stream jet propulsion engine according to the invention.

FIG. 8 is a diagrammatic side view of the engine shown in FIG. 7.

FIG. 10 is a diagrammatic illustration of a modification of the arrangement shown in FIG. 9.

FIGS. 11 and 12 are diagrammatic illustrations of drive means for valves forming part of the arrangements according to the invention.

Figure 1:
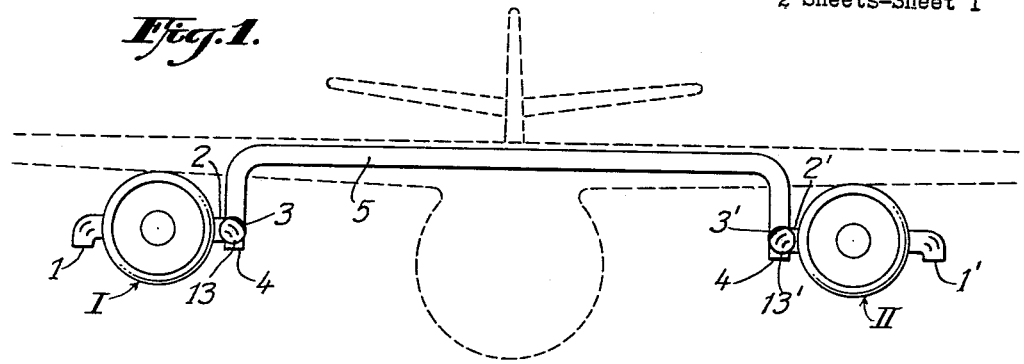
FIG. 1 is a diagrammatic front view of two propulsion units arranged at opposite sides of the center line of an airplane.

Referring more particularly to FIG. 1 of the drawing, numeral I designates a jet propulsion unit placed at one side of the fuselage and beneath the wing of an airplane, not shown, and numeral II designates a jet propulsion unit at the opposite side of the fuselage beneath the opposite airplane wing. Each propulsion unit includes a gas producer and a pair of thrust nozzles 1, 4 and 1', 4' which are placed at opposite sides of the units I and II, respectively, and are fed with gas from the respective gas producer. The nozzles 4 and 4' which are relatively close to the fuselage are connected by gas supply channels 2 and 2' provided with valves or gas stream diverting means 3 and 3', respectively, to the gas producers of the units I and II, respectively. In the illustrated position all nozzles discharge in a downward direction for lifting the airplane in a vertical direction for starting and landing. The nozzles can be turned around horizontal axes in the conventional manner for producing forward or horizontal thrust for normal flying.

The gas flow diverting means 3, 3' are connected by a conduit 5. FIG. 1 shows the means 3 and 3' in normal operating position whereby the units I and II are separated and the thrust producing gas jets emerge at either side of the units I and II from the thrust nozzles 1, 4 and 1', 4', respectively. The two units operate entirely independently and a disturbance in one power unit does not affect the opposite power unit.

The gas stream diverting means 3 and 3' are designed as rotary valves, each having a plurality of guide vanes 13 and 13'. The means 3 and 3' are connected by conventional means for interdependent operation.

FIG. 2 shows the gas stream diverting means 3 and 3' in a position for stopping gas flow in the unit I which is assumed to be out of order and for affording gas flow from the unit II to the thrust nozzle 4 through the connecting conduit 5 and stopping gas flow to the nozzle 4'. In this case gas flows in the operative unit II partly to the nozzle 1', not shown in FIG. 2, and from the unit II to the nozzle 4 of the otherwise inoperative unit I. In this way thrust symmetry is essentially maintained. It may be desired that the nozzle 4' be not completely separated from the unit II and a portion of the gas stream aavilable in the unit II be discharged through the nozzle 4'. This may be accomplished by making the operative connection between the means 4 and 4' so as to permit some gas flow to the nozzle 4' while completely separating the nozzle 4 with respect to gas flow from the unit I.

FIG. 3 shows the valve or flow diverting means 3 and 3' in the position when the gas generator of the unit II is incapacitated. The elements 3 and 3' have been turned from the normal operating position shown in FIG. 1. Direct gas flow from the gas generator of the unit I is prevented to the respective nozzle 4 and direct gas flow is also prevented from the gas generator of the unit II to the nozzle 4'. A portion of the gas generated in the unit I is conducted by the diverting element 3 into the conduit 5 and therefrom by the element 3' to the nozzle 4'. The elements 3 and 3' may be adjusted either by hand or automatically by conventional means.

Figure 4:
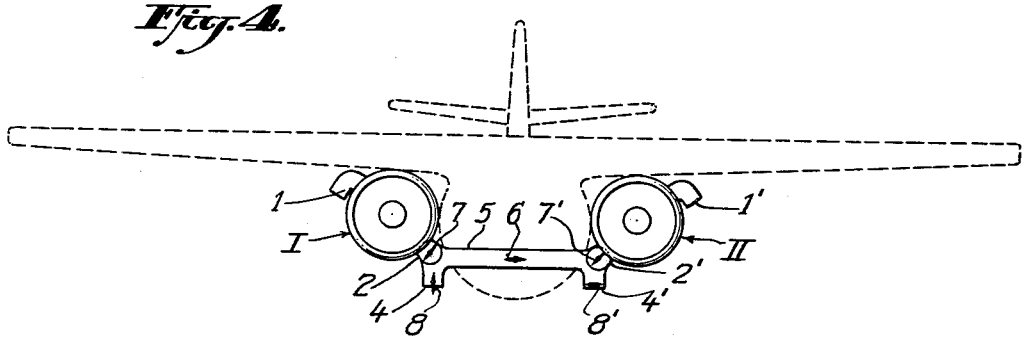
FIG. 4 is a diagrammatic end view of a modified arrangement according to the invention.

FIG. 4 shows a further modification of an apparatus according to the invention. A valve 6 is interposed in the connecting conduit 5 which valve is adapted to stop gas flow between the units I and II. The gas pressures of the two units usually counterbalance each other. They are measured by conventional means. Upon a disturbance in one of the units or failure of one of the units, the gas pressures in the two units are not balanced any more and this unbalance is used for opening the valve 6 to provide a connection between the two units I and II through the conduit 5. Simultaneously, the connection between the gas generator of the unit which is out of order and the nozzle of this unit is closed. FIG. 4 shows the apparatus in the position when the unit I is out of order. A valve 7 placed at one of the gas outlets of the gas generator of the unit I is in closed position. The valve 7 may be in the form of a conventional check valve, or may be controlled in response to the unbalance of the pressures in the two units I and II. A valve 8' is provided to stop gas flow to the nozzle 4' whereas a valve 8 controlling admission of gas to the nozzle 4 is in open position. Also in open position is a valve 7' placed at one of the gas outlets of the unit II so that the nozzle 4 is supplied by gas from the unit II through the valve 7' and the conduit 5 wherein the valve 6 is in open position. The valves forming part of the system shown in FIG. 4 may be automatically controlled by conventional means, means being preferably provided to operate these valves also by hand. As shown in FIG. 4 the thrust nozzles of each propulsion unit may be placed at different elevations if this facilitates mounting of the units on the airplane.

The invention is applicable not only to one-stream jet propulsion engines wherein thrust is produced by hot combustion gases, but also to two-stream systems wherein thrust is also produced in separate nozzles by a relatively cold stream of compressed air or by compressed air mixed with combustion gas. Such an engine is shown in British Patent No. 861,480 of February 4, 1959.

In lieu of/or in addition to connecting the nozzles 4, 4' by a valved conduit in the described manner, the nozzles 1, 1' may be connected in like manner.

In some cases it may be desirable to arrange the nozzles 4, 4' beneath the gas producing units and connect them thereto by elongating the channels 2, 2'. This arrangement is shown for the unit I in FIG. 5. The invention can also be used in combination with jet engines wherein the nozzles 4, 4' are in the neighborhood of the nozzles 1, 1'. These arrangements have the advantage that the leverage of all opposed thrust nozzles is about equal and, upon failure of one of the units I and II and redirection of the gas streams according to the invention, no undesired moment is produced.

The gas outlets 2 of each unit need not be in diametrically opposed position. They may be arranged at angle with respect to each other as shown by way of example in FIG. 6 for the unit I. In this case no elongation of a channel 2, 2' is required and the jet propulsion units can be placed very close to the fuselage or a part of the units may extend into the fuselage. This reduces the moment of inertia around the longitudinal axis of the airplane. The unit shown in FIG. 6 may be turned somewhat in clockwise direction so that the jet streams are directed away from the fuselage whereby the solution of heat and noise problems is simplified.

FIGS. 7 and 8 illustrate a preferred arrangement of a two-stream jet propulsion engine as unit I. The engine forming the unit II is not shown and is mirror-symmetric to the illustrated engine. Nozzles 1 and 4 discharge the relatively cold gas and nozzles 11 and 15 discharge the hot gas. The nozzle 15 is supplied with hot gas through a conduit 14 affording placement of the nozzle 15 close to the nozzle 1 and discharge of the hot gas away from the fuselage. If the unit I is inoperative, the nozzles 4 and 15 are supplied with gas from the unit II and thrust symmetry is essentially maintained.

Figure 9:
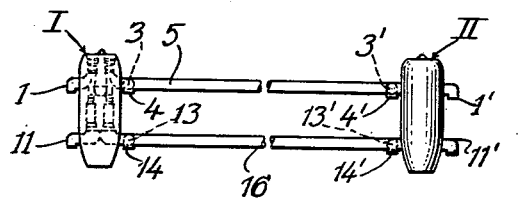
FIG. 9 is a diagrammatic top view of an arrangement according to the invention in combination with two-stream jet propulsion engines.

FIG. 9 is a diagrammatic top view of a jet propulsion system according to the invention having two two-stream jet propulsion engines I and II. The cold gas of the unit I is discharged through nozzles 1 and 4 and of the unit II through nozzles 1' and 4'. The emergency connection controlled by valves 3 and 3' is the same as in FIG. 1. The hot gas of unit I is discharged through nozzles 11 and 14 and the hot gas of unit II is discharged through nozzles 11' and 14'. The emergency connection including a conduit 16 provided with valves 13 and 13' is the same as in FIG. 1.

FIG. 10 shows an arrangement with two two-stream jet propulsion units I and II whereby only one emergency connecting conduit 17 is provided and, upon failure of unit I, cold and hot gases from unit II are mixed in conduit 17 before they are discharged through the nozzles 3 and 14. If the unit II fails, the hot and cold gases from unit I are mixed in conduit 17 prior to discharge through the nozzles 3' and 14'.

The configuration of the connecting channels 5, 16 and 17 depends on the position of the propulsion units and nozzles relative to the fuselage. If the opposite units are close to the fuselage and rather low, the connecting channel or channels may be extended through the lower part of the fuselage. In other arrangements the connecting channels may be placed inside the wings.

The invention is not limited to aircraft having two jet propulsion engines but can be applied also to aircraft having more than two jet propulsion units. In the latter case the units which are symmetrically positioned with respect to each other are interconnected for emergency purposes in the manner illustrated and described for two-engine aircraft.

FIG. 11 shows a mechanism for simultaneous, manual operation of the valve 3 and 3'. Each valve is provided with a gear rim whose teeth mesh with a pinion 18, 18'. The latter are provided with sprocket wheels around which extends an endless chain 19. Coaxially with the pinion 18' is a second sprocket wheel driven by an endless chain 20 extending also around a sprocket wheel 21 which can be rotated by manipulation of a lever 22.

FIG. 12 diagrammatically illustrates a mechanism for automatically actuating the valves 3 and 3'. The valves are connected by bevel gears 23 and 23' to a shaft 24 driven through spur gears 25 by a motor 26 which may be controlled by conventional means in response to an unbalance of the thrusts produced by the jet propulsion units I and II.

We claim:
1. An airplane comprising:
   at least two jet propulsion units placed symmetrically with respect to the longitudinal axis of the airplane,
   each unit having at least one pair of thrust nozzles laterally of the unit and a gas producer connected to said nozzles for supplying operating gas thereto,
   a connecting conduit connecting one half of the number of nozzles of one unit for gas flow with one half of the number of nozzles of the opposite unit, and
   valve means interposed between said nozzles and said conduit and each of said gas producers,
   said valve means being constructed and arranged to permit gas flow from said gas producers to said nozzles of the respective units and to stop gas flow through said conduit, during normal operation of the units, and for connecting one half of the number of nozzles of one unit for gas flow from the gas producer of the first unit to one half of the nozzles of the opposite unit and for stopping gas flow to the one half of the number of nozzles of the first unit, upon failure of the opposite unit, and for connecting one half of the number of nozzles of the opposite unit for gas flow from the gas producer of the opposite unit to one half of the number of nozzles of the first unit and for stopping gas flow to the one half of the number of nozzles of the opposite unit, upon failure of the first unit.

2. Airplane as defined in claim 1 wherein said valve means are connected for interdependent operation.

3. Airplane as defined in claim 1 wherein said valve means are in the form of rotary valves having guide means for guiding the gas flow through the valves.

4. Airplane as defined in claim 1 wherein the nozzles connected by said connecting conduit are placed at the underside of the respective units.

5. Airplane as defined in claim 1 wherein the nozzles connected by said connecting conduit are placed at the side of the respective unit which side is adverse with respect to the opposite unit.

6. Airplane as defined in claim 1 wherein the nozzles of each pair of nozzles are placed at different elevations.

7. Airplane comprising at least two jet propulsion units placed symmetrically with respect to the longitudinal axis of the airplane, each unit having at least one pair of thrust nozzles placed laterally of the unit and a gas producer connected to said nozzles for supplying operating gas thereto, a connecting conduit connecting one half of the number of nozzles of one unit for gas flow with one half of the number of nozzles of the opposite unit, a first valve interposed between said connecting conduit and each of said gas producers, a second valve interposed between said connecting conduit and each of the connected nozzles, and a third valve placed in said connecting conduit, said first and said second valves being open, and said third valve being closed during normal operation of said units, said first valve between the connecting conduit and one of said gas producers and said second valve between the connecting conduit and the connected nozzle of the opposite unit being closed, said first valve between the connecting conduit and the opposite gas producer and said second valve between the connecting conduit and the nozzle of the first unit and said third valve being open, upon failure of the gas producer of the first unit, and said first valve between the connecting conduit and the first gas producer and said second valve between the connecting conduit and the connected nozzle of the opposite unit being open, said first valve between the connecting conduit and the opposite gas producer and said second valve between the connecting conduit and the nozzle of the first unit being closed, and said third valve being open upon failure of the gas producer of the opposite unit.

8. Airplane comprising at least two jet propulsion units of the two-stream type and placed symmetrically of the longitudinal axis of the airplane, each unit having a thrust nozzle exhausting relatively cold gas and a thrust nozzle exhausting relatively hot gas, and a gas producer producing a stream of relatively cold gas and a stream of relatively hot gas and connected to the respective nozzles for supplying operating gas thereto, conduit connecting nozzles of opposite propulsion units and including valve means for permitting flow of gas from said gas producers to the nozzles of the respective units and for closing said conduit means at normal operation of said units and for conducting gas from the gas producer of one of said units to the connected nozzle of the opposite unit and for disconnecting with respect to gas flow, the connected nozzle of the first unit from the gas producer of the first unit, upon failure of the gas producer of the opposite unit, and for conducting gas from the gas producer of the opposite unit to the connected nozzle of the first unit and for disconnecting, with respect to gas flow, the connected nozzle of the opposite unit from the gas producer of the opposite unit upon failure of the gas producer of the first unit.

9. Airplane as defined in claim 8 wherein said conduit means includes separate conduits for connecting the nozzles of opposite units which nozzles exhaust relatively cold gas and for connecting the nozzles of opposite units which nozzles exhaust relatively hot gas.

10. Airplane as defined in claim 8 wherein said conduit means includes a single conduit connected to nozzles exhausting relatively cold and relatively hot gas and pertaining to one of said units and to nozzles exhausting relatively cold and relatively hot gas and pertaining to the opposite unit, for mixing the relatively cold gas with the relatively hot gas in said single conduit.

11. Airplane as defined in claim 8 wherein said thrust nozzles are placed laterally of the respective units, and unconnected thrust nozzles of opposite units exhausting relatively cold gas are placed in adverse relation and the connected thrust nozzles of opposite units exhausting relatively hot gas are placed in adverse relation.

References Cited in the file of this patent
UNITED STATES PATENTS

| | | |
|---|---|---|
| 2,650,666 | Dorand et al. | Sept. 1, 1953 |
| 2,912,189 | Pouit | Nov. 10, 1959 |

OTHER REFERENCES

IAS Report No. 59–60, Convertible Turbojet Engines for VTOL Aircraft, Zipkin et al., page 10, FIGURE 10 relied on.